H. BARLOW.

ELEVATOR FOR MARINE VESSELS.

APPLICATION FILED SEPT. 15, 1913.

Reissued May 30, 1916.

14,140.

2 SHEETS—SHEET 1.

WITNESSES:

C. B. Gibbons

E. Peterson.

INVENTOR

H. BARLOW

BY

Pierce Barnes

ATTORNEY

THE COLUMBIA PLANOGRAPH CO., WASHINGTON, D. C.

H. BARLOW.

ELEVATOR FOR MARINE VESSELS.

APPLICATION FILED SEPT. 15, 1913.

Reissued May 30, 1916.

14,140.

2 SHEETS—SHEET 2.

WITNESSES:

C. B. Gibbons.

E. Peterson

INVENTOR

H. BARLOW

BY

Pierce Barnes

ATTORNEY

UNITED STATES PATENT OFFICE.

HARRY BARLOW, OF SEATTLE, WASHINGTON.

ELEVATOR FOR MARINE VESSELS.

14,140. Specification of Reissued Letters Patent. Reissued May 30, 1916.

Original No. 1,006,044, dated October 17, 1911, Serial No. 578,983. Application for reissue filed September 15, 1913. Serial No. 789,917.

*To all whom it may concern:*

Be it known that I, HARRY BARLOW, a citizen of the United States, residing at Seattle, in the county of King and State of Washington, have invented new and useful Improvements in Elevators for Marine Vessels, of which the following is a specification.

This invention relates to that class of marine vessels which are utilized in carrying freight, and, more particularly, to such as are employed in bodies of water subject to tidal variations.

It is the object of my invention to afford means whereby loading or unloading of a vessel's cargo can be more readily and quickly accomplished, which will afford a greater cargo capacity in proportion to the size of the vessel and will require a less expenditure of power to transpose a given load from or to the vessel than obtainable with forms of boats or by the equipments thereof heretofore in use.

To these ends, the invention consists in improvements in the construction of a vessel whereby a part of a deck thereof constitutes a vertically movable platform for the raising or lowering of a quantity of goods deposited thereupon from a selected elevation in the vessel to a gangway leading to a wharf or other landing place; the invention also relates to the machinery whereby these results are attained, as will be hereinafter described and claimed.

Figure 1:
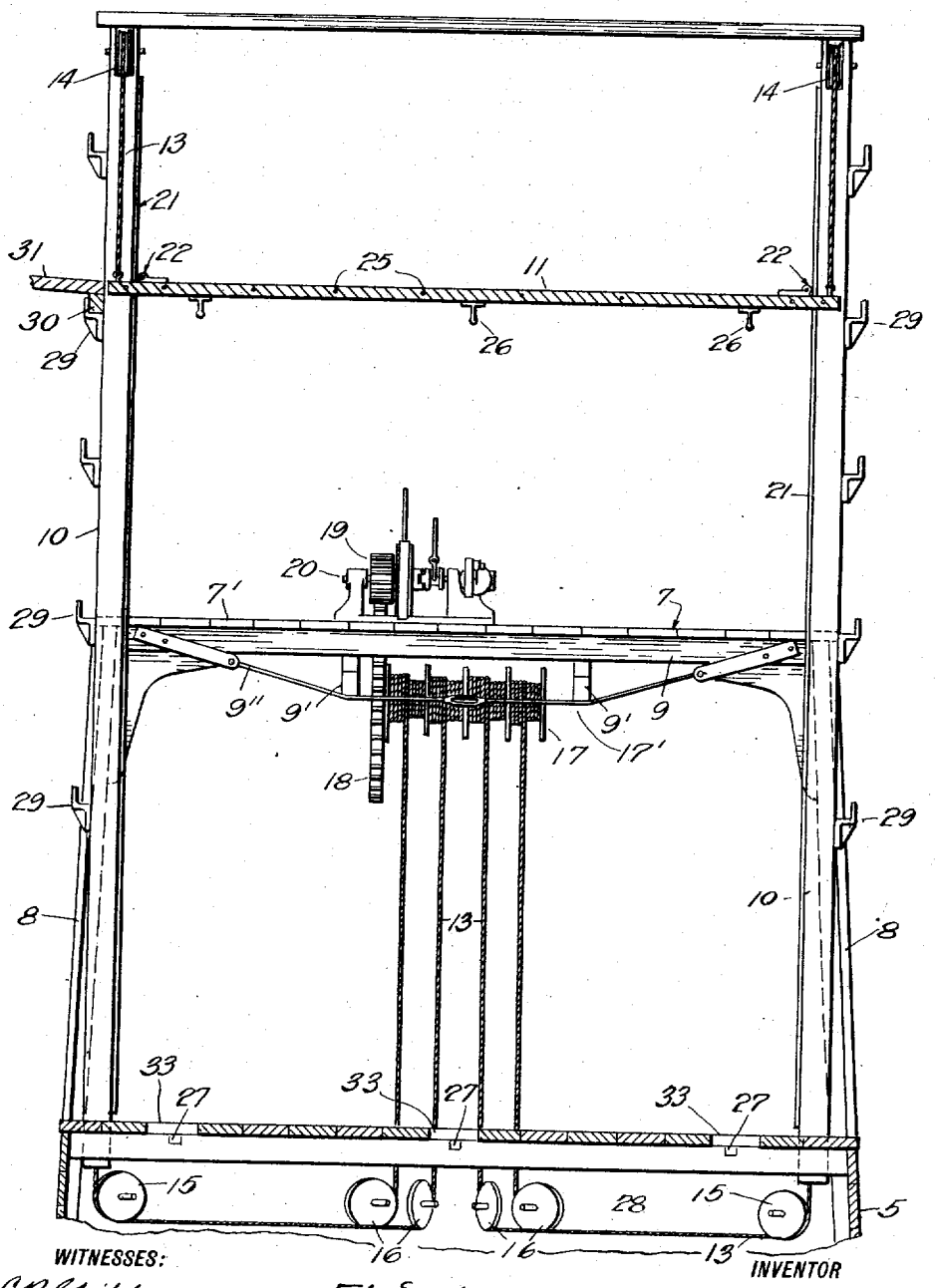
Figures 2, 3:
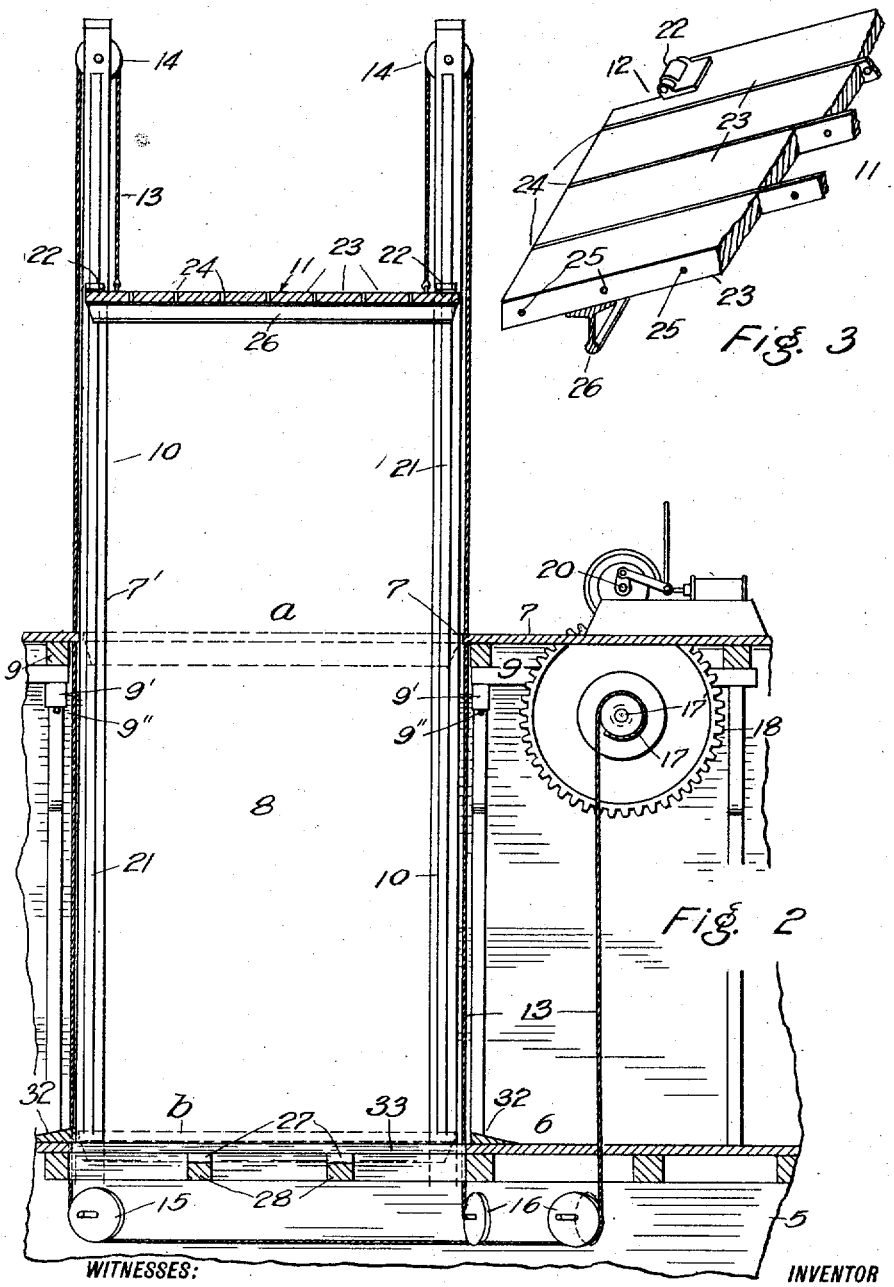

In the accompanying drawings, Figure 1 is a transverse vertical sectional view of a portion of a boat embodying my invention. Fig. 2 is a longitudinal vertical section of the same. Fig. 3 is a perspective view of a portion of the movable deck or platform shown in the other views.

The reference numeral 5 designates the hull of a boat which may be of the usual or approved construction and is provided with a lower deck 6 and an upper deck 7. The upper deck is discontinuous to provide an opening extending between the deck-ends $7^1$ and the entire width of the deck. As illustrated, the sides of the boat above the lower deck are likewise formed with openings 8 of corresponding lengths to that of the deck-opening thus providing a gap in the vessel which extends down to the lower deck. The upper deck structure in front and to the rear of the gap is reinforced as by the provision of truss members comprising deck beams 9, struts 9′ and tie-rods 9″.

Positioned at the sides of the vessel and in juxtaposition with the deck-ends $7^1$ and upright posts 10 rigidly secured to the boat structure.

11 is a platform adapted to substantially close the opening in the upper deck and, upon occasion, to form a part thereof. At its corners, said platform is provided with recesses 12 (Fig. 3) to accommodate the aforesaid posts.

The platform is sustained from near its corners by cables 13 which extend upwardly and over pulleys 14 supported by the respective posts and from which pulleys the various cables extend down to and about guide-pulleys 15 located below the lower deck and whence the cables are led by guide-pulleys 16 to a winding-drum 17. This drum is mounted upon a shaft $17^1$ carrying a gear wheel 18 which is driven by a pinion 19 upon the shaft 20 of a suitable hoisting engine. Said engine is desirably located upon the upper deck.

21 designates metal bars secured to the inner faces of the posts to furnish tracks for guide rolls 22 provided on the platform 11. The platform (see Fig. 3) is constructed of a series of transversely arranged deck planks 23 alternating with metal bars 24 and united by spaced bolts 25 extending through the several planks and bars. This platform is further provided with longitudinal T-bars 26 secured to the underside of the platform planks.

To allow the platform being lowered and to rest upon the lower deck, certain of the planks are removed from the latter to allow the depending flanges of said T-bars to extend into notches 27 provided in the beams 28 of the deck.

29 indicates brackets secured to the outer faces of the posts 10 for supporting at various predetermined heights a beam 30 which, in turn, supports an end of a gangway 31, shown in Fig. 1.

The operation of the invention is as follows: When a vessel provided with the invention is to unload, for example, upon a wharf, then the beam 30 would be engaged in the brackets upon the side of the vessel adjacent to the wharf which would support the gangway 31 in a nearly horizontal position. The platform 11 is then alternately raised and lowered under the power and control of the hoisting engine to or from the level of the gangway and the deck which carries the cargo. The goods are most conveniently handled by using a number of trucks which are wheeled upon the platform to the capacity of the latter and when the platform is brought to the gangway level the trucks are wheeled over the gangway and upon the wharf. The empty trucks are then returned to the platform which is then raised or lowered, as may be required, to the deck for receiving a further load on the platform, and so on. When the cargo is upon the upper deck 7 the platform would be stopped at the position indicated by dotted lines *a* in Fig. 2; but in discharging a cargo from the lower deck the platform would be stopped in the position indicated by dotted lines *b* in said view when the platform would be borne upon the lower deck 6 while the T-bars 26 would extend into the notches 27 of the beams 28 and subsequent to the exposure of such notches by the removal of unfastened planks from the deck. The trucks are most conveniently wheeled onto or from the platform when upon this lower deck by utilizing a number of triangular shaped blocks or "risers" 32 (Fig. 2) to provide a runway for the truck wheels.

By placing the engine upon the upper deck the operator therefore has an unobstructed view to more reliably stop the platform at the various stages of its movements.

The manner of loading the vessel will, it is thought, be understood from the foregoing. After a cargo is deposited upon the decks, the planks which have previously been removed from the lower deck are restored to close the openings 33, and also the platform 11 is brought into the position indicated by *a* in Fig. 2, thus closing the openings in both decks; whereupon the cargo may be distributed to occupy the space between the posts on both decks.

It may be stated that the hoisting engine should be provided with suitable brake and clutch devices such as are employed with engines of this type and whereby the lowering of the platform is attained without the consumption of the power medium.

The advantages of the invention reside principally in the celerity in which a cargo can be loaded or unloaded at all stages of the tide or from different heights and in practice has demonstrated that with the present invention the work can be done in at least one-fifth the time which was occupied prior to the application of the invention.

What I claim as my invention is—

1. In an apparatus of the class described, the combination with the hull of a vessel provided with an upper and lower deck, the upper of said decks having an opening therein, of a vertically movable platform formed of a series of planks and T-bars, guide pulleys located below the lower deck, supporting posts, guide pulleys upon said posts, cables connected to said platform and traveling over said guide pulleys, and means whereby said cables are actuated for hoisting and lowering said platform, certain of the beams of the lower deck being provided with notches for the reception of said T-bars when the platform is lowered against the lower deck.

2. In an apparatus of the class described, the combination with the hull of a vessel provided with an upper and a lower deck, the upper of said decks having an opening therein, of a vertically movable platform formed a series of planks and T-bars, guide pulleys located below the lower deck, supporting posts, guide pulleys upon said posts, cables connected to said platform and traveling over said guide pulleys, means whereby said cables are actuated for hoisting and lowering said platform, certain of the beams of the lower deck being provided with notches for the reception of said T-bars when the platform is lowered against the lower deck, and means provided upon the posts for supporting the end of a gangway at various predetermined heights.

3. In apparatus of the class described, the combination with the hull of a vessel having a plurality of decks positioned therein, of an opening extending transversely through the hull of said vessel from a point coincident with one of said decks up to and including another of said decks, a plurality of posts secured to the hull, a pulley supported by each of said posts, a platform arranged to substantially close said opening and adapted to span the width of said vessel, cables connected with the platform and passing about the respective pulleys, and means to actuate the cables to effect the raising and lowering of the platform.

4. A marine vessel having a hull formed with a lower deck, an upper deck and side walls therebetween, the upper deck having an opening extending the entire width of the vessel, said side walls each having an opening of corresponding lengths to that in said upper deck affording a gap in said vessel extending down to said lower deck, and a plurality of upright posts rigidly secured to said hull adjacent the sides of said openings in the side walls and extending above said upper deck, and a platform supported from said posts movable in said openings above and below the upper deck.

5. In combination, the hull of a vessel formed with upper and lower decks and side walls, said upper deck having a transverse opening therein and said side walls having openings with widths coextensive with said transverse opening and extending from the upper deck to the lower deck, a platform vertically movable in said openings, and means to operate said platform.

6. The combination of a vessel formed with an opening in its side wall extending from its lower deck to its upper deck, said upper deck having an opening therein of width equal to said opening in the side wall, and a platform adapted to close the opening in said upper deck and extending laterally to said opening in the side wall, and means to raise and lower said platform.

7. The combination with the hull of a vessel provided with an upper and a lower deck and side walls therebetween, said upper deck formed with an opening and said side walls having an opening extending from said lower deck to and corresponding in width with the opening in the upper deck, a platform movable vertically in said openings, and means to raise and lower said platform.

8. The combination with the hull of a vessel provided with an upper and a lower deck and side walls therebetween, said upper deck formed with an opening and said side walls having an opening extending from said lower deck to and corresponding in width with the opening in the upper deck, a platform movable vertically in said openings, means to raise and lower said platform, a beam adapted to extend across the opening in said side walls, a series of independent brackets, as shown and described, secured to the outer faces of said side walls for supporting said beam at various elevations, and a gangway supported at one end by said beam.

9. The combination with a marine vessel having an opening in its deck extending vertically downward in the side wall of the vessel, upright posts secured to said side wall of the vessel along the vertical sides of said opening and extending above said deck, and a platform supported from said posts and movable above and below said deck, of a beam for supporting the outer end of a gangway, a series of independent brackets, substantially as shown and described, upon said posts for adjustable engagement with said beam at various elevations of said gangway.

10. The combination with the hull of a vessel having an opening in its upper deck and an opening in its side wall extending from said opening in the upper deck to the lower deck, a platform movable vertically in said openings, means to operate said platform, spaced upright posts rigidly secured to said side walls upon opposite sides of said second named opening, devices for supporting one end of a gangway, and a series of independent brackets upon said posts for supporting said devices at adjusted elevations.

11. The combination with the hull of a vessel formed with upper and lower decks and side walls, said upper deck having a transverse opening therein and said side walls having openings extending from the opening in said upper deck to the lower deck, a platform movable vertically in said openings, means to raise and lower said platform, a pair of upright posts rigidly secured to said side walls upon opposite sides of said side openings, vertically adjustable means on said posts for supporting a gangway, in a substantially horizontal position.

12. The combination with a floating vessel, said vessel having a deck with a transverse opening therein, a platform adapted to close the deck opening and vertically movable to elevations above and below said deck, and means to operate said platform, of a pair of upright posts spaced apart and rigidly secured to said vessel upon opposite sides of said deck opening, a beam adapted to be adjustably secured at various elevations to said posts upon one side of the path of said platform, whereby a gangway may be freely supported at its opposite ends upon said beam and upon a quay or dock.

13. The combination with the hull of a vessel having a deck provided with an opening, a plurality of posts secured to the hull and extending above and below said deck, a vertically movable platform arranged to substantially close said deck opening, pulleys carried by the posts, cables connected with the platform and traveling over said pulleys, means for actuating the cables to effect the elevating and lowering of the platform above and below said deck, and means upon the posts for supporting a horizontally arranged beam at various elevations, said beam affording means whereby the gangway connecting the vessel with the dock is supported in a substantially horizontal plane.

HARRY BARLOW.

Witnesses:
E. PETERSON,
HORACE BARNES.

Copies of this patent may be obtained for five cents each, by addressing the "Commissioner of Patents. Washington, D. C."